United States Patent [19]

Uesugi et al.

[11] Patent Number: 5,102,223

[45] Date of Patent: * Apr. 7, 1992

[54] METHOD AND APPARATUS FOR MEASURING A THREE-DIMENSIONAL CURVED SURFACE SHAPE

[75] Inventors: Mitsuaki Uesugi; Masaichi Inomata; Isamu Komine, all of Kanagawa, Japan

[73] Assignee: NKK Corporation, Tokyo, Japan

[*] Notice: The portion of the term of this patent subsequent to Oct. 17, 2006 has been disclaimed.

[21] Appl. No.: 652,446

[22] Filed: Feb. 7, 1998

Related U.S. Application Data

[63] Continuation of Ser. No. 259,037, Oct. 17, 1988, abandoned.

[30] Foreign Application Priority Data

Mar. 31, 1988 [JP] Japan ................................ 63-76389
Mar. 31, 1988 [JP] Japan ................................ 63-76390
Mar. 31, 1988 [JP] Japan ................................ 63-76391

[51] Int. Cl.$^5$ .................... G01B 11/24; G02B 27/42
[52] U.S. Cl. .................... 356/376; 250/550; 250/560
[58] Field of Search ............ 356/375, 376, 373, 380; 250/560, 561, 202

[56] References Cited

U.S. PATENT DOCUMENTS

| | | | |
|---|---|---|---|
| 4,158,507 | 6/1979 | Himmel | 356/376 |
| 4,641,972 | 2/1987 | Halioua et al. | 356/376 |
| 4,657,394 | 4/1987 | Halioua | 356/376 |
| 4,687,326 | 8/1987 | Corby, Jr. | 356/376 |
| 4,794,262 | 12/1988 | Sato et al. | 356/376 |
| 4,794,550 | 12/1988 | Greivenkamp, Jr. | 250/550 |
| 4,874,955 | 10/1989 | Uesugi et al. | 356/376 |

FOREIGN PATENT DOCUMENTS 60-196608 10/1985 Japan .
60-200141 10/1985 Japan .
60-253806 5/1986 Japan .

OTHER PUBLICATIONS

"Method and Its Instrumentation for 3-D Shape Measurement", Electronical Information Communication Institute, Oct. 1988 (Araki et al.)

Primary Examiner—Richard A. Rosenberger
Assistant Examiner—Hoa Pham
Attorney, Agent, or Firm—Michael N. Meller

[57] ABSTRACT

A method and apparatus for measuring a three-dimensional curved surface shape based on a new measuring principle that a surface of an object to be measured is coded with information relating to a slit light which is used as a medium and moved or rotated at a constant speed. The manner in which a linear reflected pattern of the slit light is moved over the surface of the object to be measured is picked up by a television camera to form a composite image in which a value of each of picture elements in the image is represented by information relating to the slit light, e.g., a position, time or projection angle of the slit light at an instant that the slit light passes through one of positions on the object surface corresponding to that picture element. Then, a difference in value between each corresponding picture elements of the composite image and another composite image formed similarly with respect to a reference plane is determined to measure a three-dimensional curve surface shape of the object to be measured.

18 Claims, 15 Drawing Sheets

FIG. 1 PRIOR ART
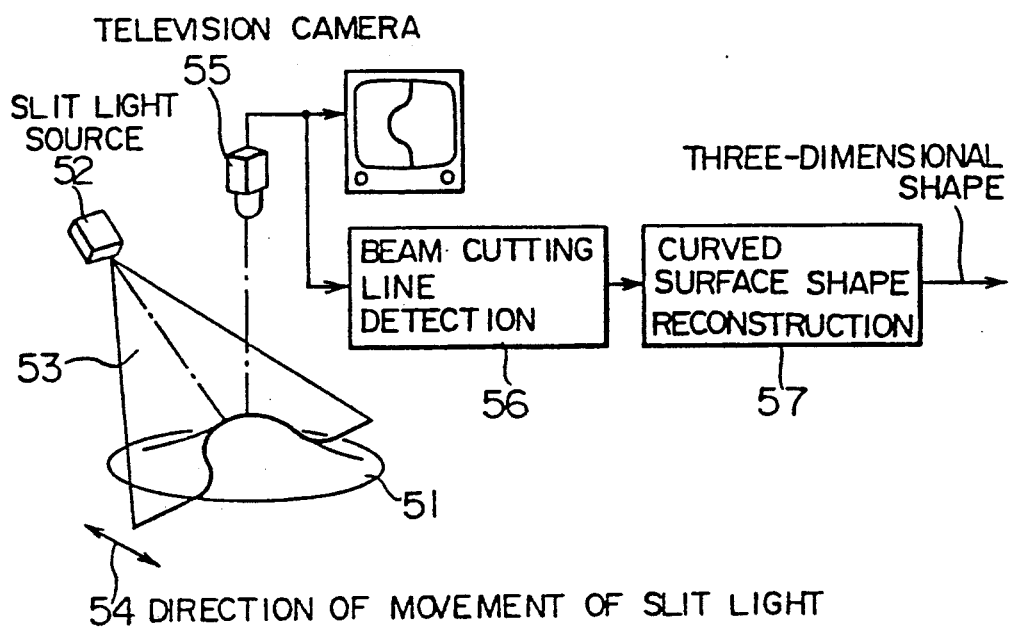
FIG. 2a PRIOR ART
INCIDENCE OF ANGLE CLOSE TO VERTICAL (HIGH ACCURACY)
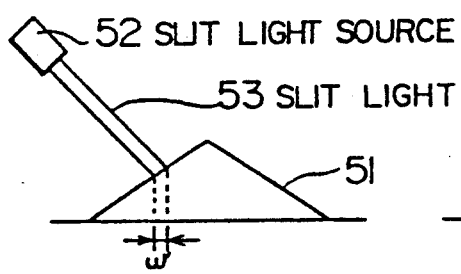
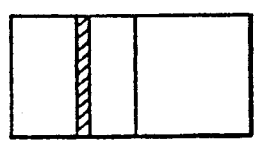
FIG. 2b PRIOR ART
INCIDENCE OF ANGLE CLOSE TO PARALLEL (LOW ACCURACY)
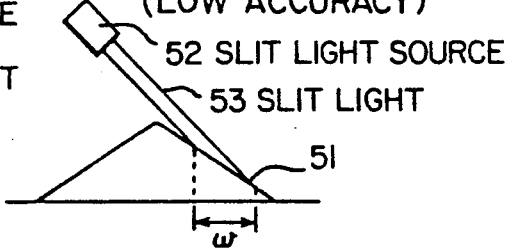
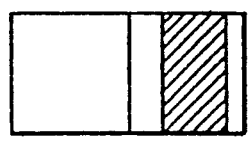

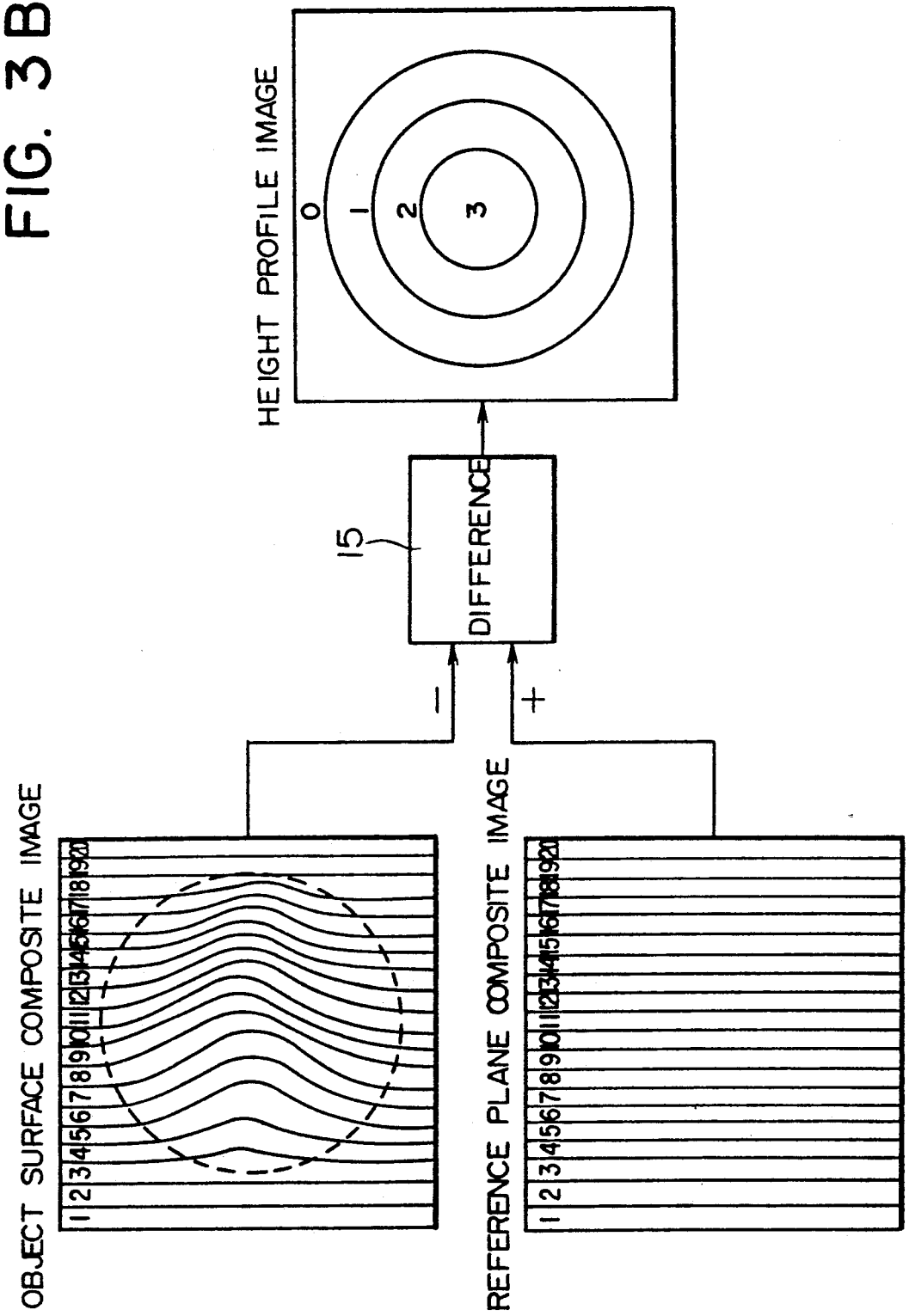

(c) SIDE VIEW

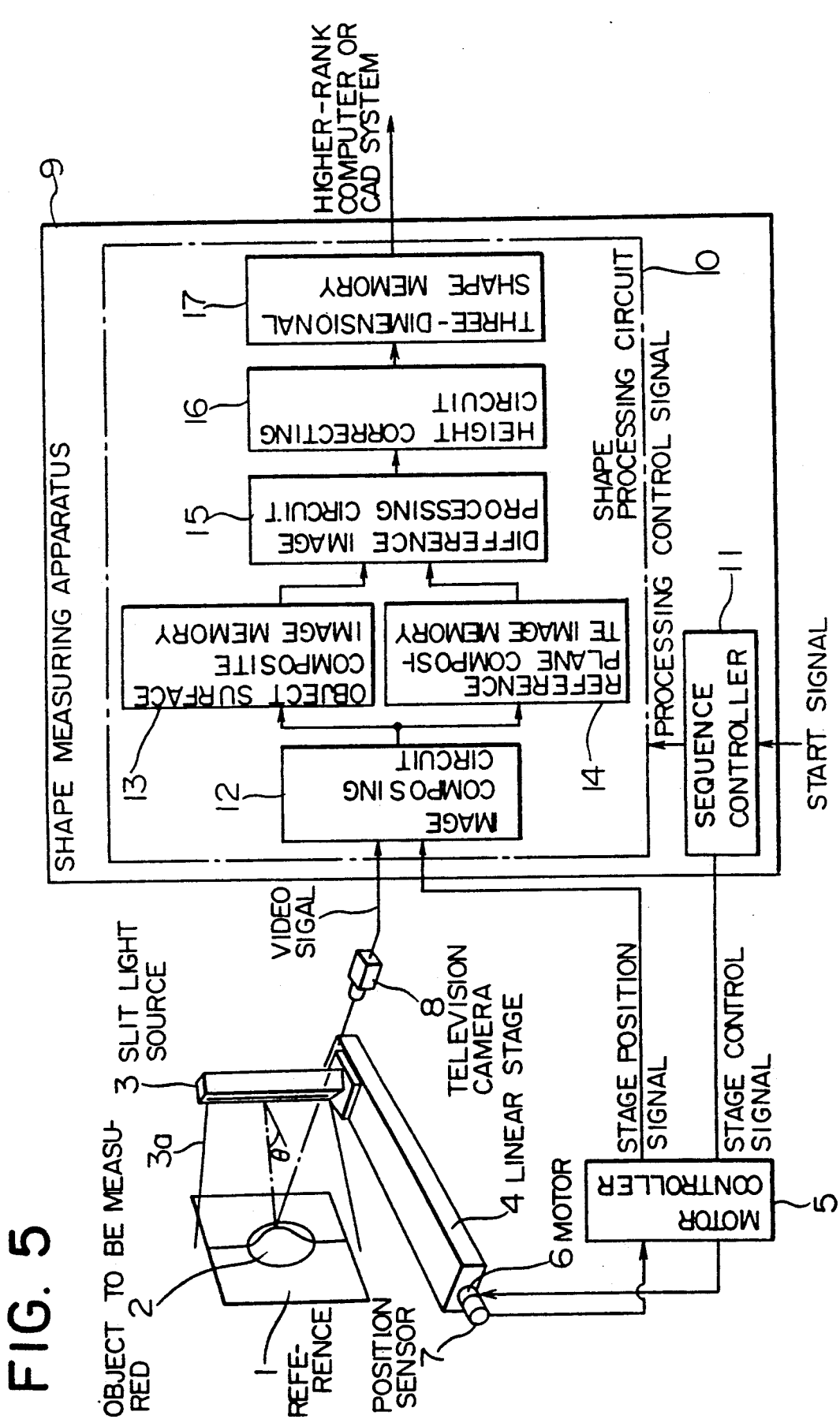

FIG. 13
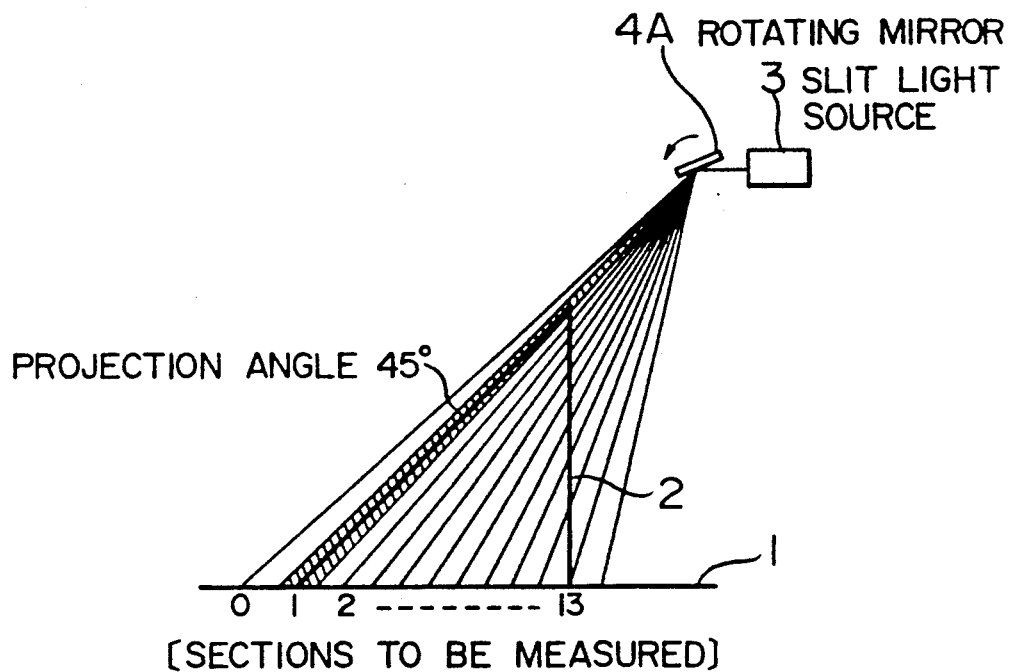
[SECTIONS TO BE MEASURED]
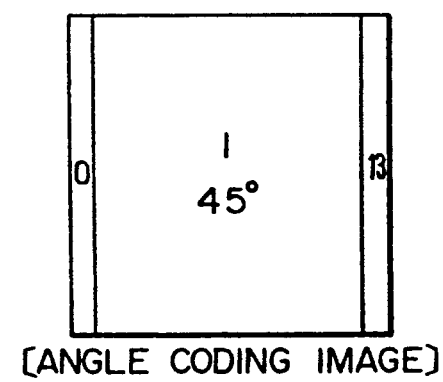
[ANGLE CODING IMAGE]
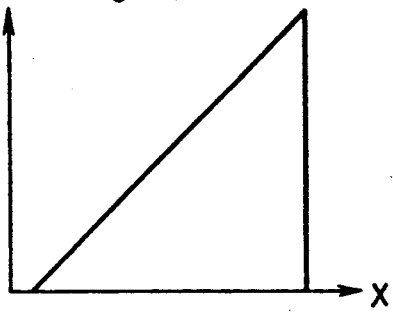
[MEASURED RESULTS]

METHOD AND APPARATUS FOR MEASURING A THREE-DIMENSIONAL CURVED SURFACE SHAPE

This application is a continuation of application Ser. No. 259,037, filed Oct. 17, 1988, now abandoned.

BACKGROUND OF THE DISCLOSURE

The present invention relates to a method and apparatus for measuring a three-dimensional curved surface shape in a non-contact manner.

The measurement of three-dimensional curved surface shapes is conceivable for practical use in a wide range of applications such as a three-dimensional CAD input, robot vision, body contour measurement for medical and dressmaking purposes and various techniques have been proposed in the past.

Particularly, one such technique well known as a light-section method or optical cutting method is described for example on pages 398 and 399 of "Handbook for Image Processing" (Shokodo Co., Ltd.). As shown in FIG. 1 of the accompanying drawings, this method notes a phenomemnon that when a slit Light 53 is projected from a slit light source 52 onto an object 51 to be measured, a light beam pattern formed on the surface of the object corresponds to the cross-sectional shape of the object 51 at the slit light projection position when the light beam pattern is observed from a direction different from the projecting direction and the method has been used widely by virtue of its simplicity, non-contactness and quantitative property.

When measuring the shape of a three-dimensional curved surface by this optical cutting method, while moving the slit light 53 in the directions of an arrow 54, the resulting light beam patterns are observed by a television camera (55) and the thus generated video signal is processed from moment to moment, thereby extracting (56) the beam cutting lines (the shapes of the light beam patterns) within the image and reconstructing (57) the cutting lines to construct the curved surface shape.

While a method is known in which the construction of an optical system includes a light spot scanner as a light source in place of the slit light source 52 and a high-speed light spot position detecting device known as a PSD (position sensitive detector) sensor, for example, is used in place of the television camera 55, the basic principle is the same as the one shown in FIG. 1.

While the above-mentional optical cutting method is one having various advantages, in order to detect and specify the respective points on an object to be measured, the process of extracting the beam cutting lines within each image is essential and this causes the following problems from the standpoint of measuring accuracy or reliability.

(1) Deterioration of the Measuring Accuracy and Spatial Resolution Dependent on the Shape of an Object to be Measured With the optical cutting method, as shown in FIG. 2(a), if the surface of the object 51 to be measured in an inclined surface of an angle close to a right angle with respect to the optical axis of the slit light 53, the width w of a light beam pattern at the object surface is narrow and it is possible to make a highly accurate measurement. However, if the surface of an object to be measured is an inclined surface of an angle approximately parallel to the optical axis of the slit light 53 as shown in FIG. 2(b), the width w of a light beam pattern at the object surface is increased so that not only is the uncertainty of the position during the beam cutting line increased with resulting deteriorated accuracy, but also the amount of movement of the light beam pattern on the object surface due to the movement of the slit light source 53 is increased, thereby simultaneouly deteriorating the spatial measuring resolution.

(2) Deterioration of the Measuring Reliability Due to the Surface Reflectance of an Object to be Measured With the optical cutting method, it is presupposed that during the process of extracting the beam cutting lines in a picture, the light beam pattern is sufficiently bright as compared with the ambient brightness so that if, for example, there is a considerable nonuniformity in the reflectance of the object surface or alternatively the angle of the inclined surface of the object surface is close to the optical axis of the slit light, thus decreasing it reflected light intensity, there are frequent cases where during the extraction of the beam cutting lines the occurrence of discrete points is frequently caused or entirely wrong points are detected by mistaking them for the beam cutting lines. Such a phenomenon is caused in cases where there exists any background light other than the slit light during the measurement, and each of such phenomena causes deterioration of the measuring reliability or restricts the measuring environments of objects to be measured.

As a result, due to some measuring problems arising from the beam cutting line extraction process, the optical cutting method has many restrictions from the application standpoint e.g., the shapes, the surface contours and the environments of objects to be measured and it applications are limited for its advantages including the simplicity, non-contactness, quantitativeness, etc. Thus, this method has not gone so far as to be assembled as a general-purpose three-dimensional curved surface shape measuring apparatus and put widely into practical use.

SUMMARY OF THE INVENTION

It is an object of the present invention to provide a three-dimensional curved surface shape measuring method and apparatus based on a new measuring principle which, while employing an optical system similar to that used in the optical cutting method, introduces a new system of using a slit light moving or rotating at a constant speed as a medium to code the surface of an object to be measured with information relating to the slit light, thereby completely eliminating the need for the beam cutting line extracting process.

In accordance with the invention, a television camera picks up the manner in which the linear reflected pattern of a slit light is moved over the surface of an object to be measured so that each time the slit light passes through the position on the surface of the object corresponding to each of the picture elements within the image, the information relating to the slit light, e.g., the position, time or light projecting angle or the corresponding value is used as the value of the picture element, thereby forming a composite image. Then, for example, this composite image is compared with another composite image produced in a similar manner with respect to the reference plane excluding the object to be measured to determine the difference in value between each pair of corresponding picture elements of the two composite pictures and thereby to measure the three-dimensional curved surface shape of the object.

Thus, in accordance with the invention, while using the same optical system of the optical system as the optical cutting method, even in the case of an object to be measured having for example an inclined surface shape of an angle close to the projection angle of a slit light, the composite image of the object to be measured is compared with the composite image of the reference plane to determine the difference in value between each pair of corresponding picture elements of the images and thereby to measure the three-dimensional shape therefore the measurement of an such inclined surface can be effected with about the same measuring accuracy and spatial resolution as the beam width or the sampling pitch of the slit light, thereby making it possible to measure the shape of any object to be measured irrespective of its shape.

Further, in accordance with the invention, while the manner in which the linear reflected pattern of the slit light is moved over the surface of the object to be measured is picked up by the television camera to perform an image composing processing in such a manner that the value of each of the picture elements within the image represents, for example, the position of the slit light at the instant that the slit light passes through the position on the object surface corresponding to that picture element, the only requisite condition for the establishment of the image composing processing and the accurate determination of the shape information is that each of the positions on the object to be measured corresponding to one of the picture elements has a brightness which becomes maximum at the instant that the slit light passes through that position.

As a result, not only variations in the surface reflectance of an object to be measured have no effect on the measurement, but also the brightness at each of the positions on the object surface becomes maximum at the instant that the slit light passes through that position even if there exists background light so far as its light quantity is constant in time and the brightness is such that the signal from the television camera is not saturated, thereby ensuring the measurement is not subject to the effects of the surface reflectance of the object to be measured and the background light. Also, where the time is written as the value of each picture element, no position detector is required and the synchronizing signals of the television camera can be used as the required timing signals.

Still further, in accordance with the invention, in addition to the composite image of the surface of the object to be measured and the composite image of the reference plane, a composite image of a second reference plane is formed and the three-dimensional curved surface shape of the object is measured on the basis of these composite images. In this way, by making the measurement through the provision of the two reference planes, it is possible to make the measurement independently of the projection angle and scanning speed of the slit light, thereby enhancing the measuring accuracy.

Still further, in accordance with the invention, the composite images of the first and second reference planes are not formed at the time of each measurement but they are preliminarily measured or obtained by calculation and stored so that they are fetched and used when making the measurement. When producing such composite images, by preliminarily obtaining them by calculation, the operations during the measurement are simplified.

BRIEF DESCRIPTION OF THE DRAWINGS

FIG. 1 is a schematic diagram showing a conventional Light-section method or optical cutting method.

FIGS. 2(a) and (b) are diagrams showing the manners in which the measuring accuracy of the conventional optical cutting method varies in dependence with the inclined surface angles.

FIGS. 3A and 3B are diagrams for explaining the measuring principles of first and second embodiments of the invention.

FIG. 5 is a block diagram showing the construction of the three-dimensional shape measuring apparatus according to the first embodiment of the invention.

FIG. 13 shows an example of the measurement of an inclined surface shape.

DESCRIPTION OF THE PREFERRED EMBODIMENTS

Figure 3A:
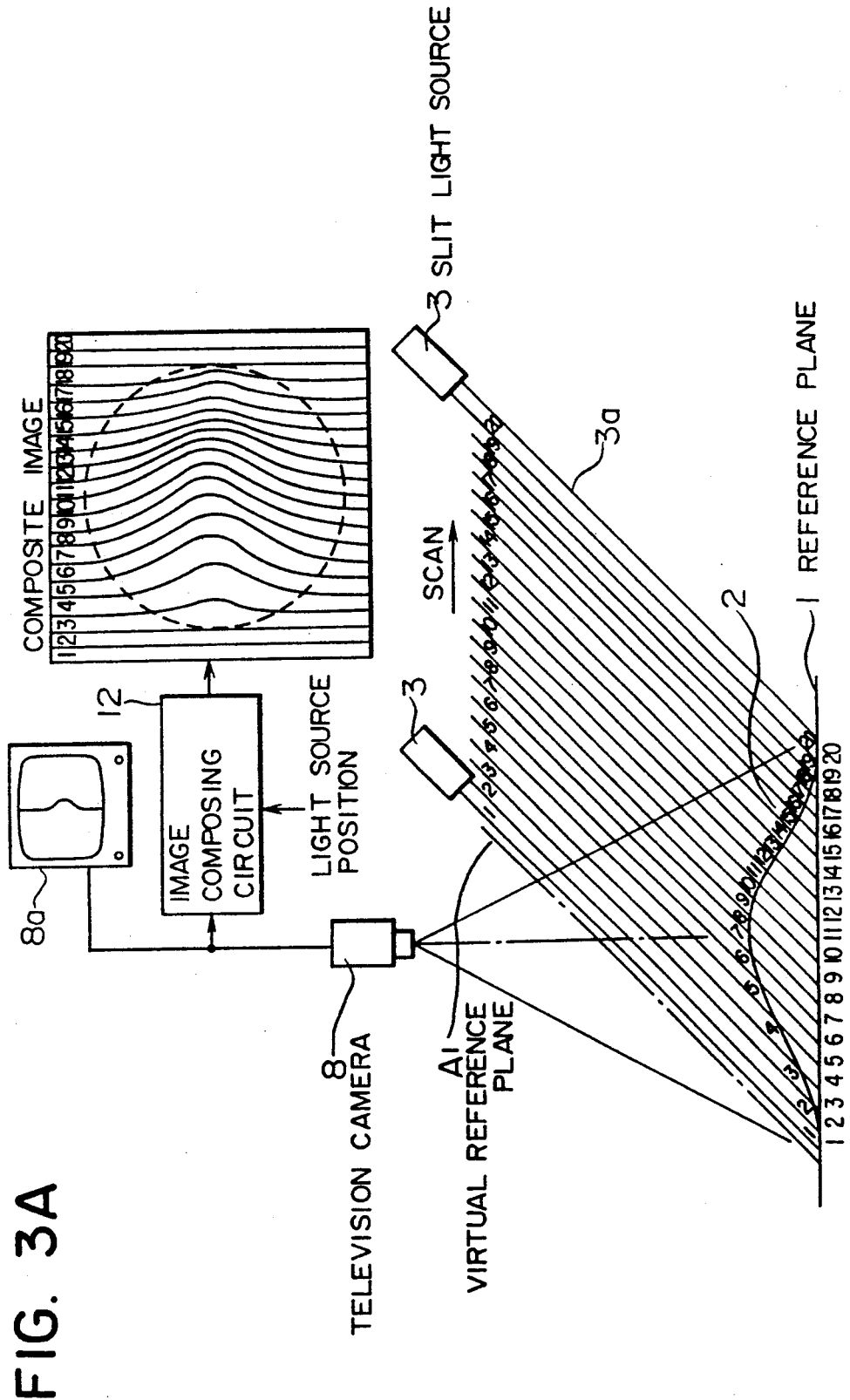

Prior to describing first embodiment of the invention, its principle will be first described conceptually with reference to FIGS. 3A and FIG. 3B.

As shown in FIG. 3A, a slit light 3a spreading vertically to the paper plane is projected obliquely from above onto the surface of an object 2 to be measured which is placed on a reference plane 1, and then the object 2 is picked up by a television camera 8 from for example just above the object 2 while moving the slit light 3a transverse to the paper plane. At this time, the manner in which the linear reflected pattern of the slit light 3a at the object surface is moved transverse to the image plane is observed on a television 8a monitor connected to the television camera 8.

As mentioned previously, the linear shape of the reflected pattern of the slit light 3a reflects the irregularity information of the object surface and the conventional optical cutting method is designed so that the linear shape of the reflected pattern is sampled from moment to moment and reconstructed, thereby measuring the three-dimensional shape of the object to be measured.

In accordance with the invention, from the video signal generated by the television camera 8 picking up the manner in which the linear reflected pattern of the slit light 3a is moved over the surface of the object 2, a composite image is formed in which each of the picture elements within the image has a value representing the position of the slit light source at the instant that the slit light 3a passes through the position on the object surface corresponding to that picture element or at the instant that the brightness of that object surface position becomes maximum.

With the thus produced composite image, the values of its respective picture elements represent a height profile of the object surface based on a plane A (hereinafter referred to as a virtual reference plane) shown by the dot-and-dash line in FIG. 3A. In this way, the height profile based on the virtual reference plane A of the object surface is measured.

However, generally the three-dimensional shape measurement of an object must measure the profile based on the positions on the plane on which the object 2 to be measured is placed (the reference plane of FIG. 3A which is hereinafter referred to as a reference plane) and not the profile with respect to the virtual reference plane A in FIG. 3A.

To satisfy this requirement, it is necessary that after the above-mentioned measurement with respect to the object surface has been made, thus measuring its height profile based on the virtual reference plane A and then the object has been removed, the same measurement is made with respect to the reference plane 1, thus measuring a height profile based on the virtual reference plane A and then, as shown in FIG. 3B, the difference in value between each pair of corresponding picture elements of the two height profile images, i.e., the object surface composite image and the reference plane composite image, is computed. As the result of this processing, a height profile image on the basis of the reference plane 1 is produced and the value of each of the picture elements of this height profile image is proportional to the height of the corresponding position on the surface of the object to be measured which is based on the reference plane 1.

Figure 4A:
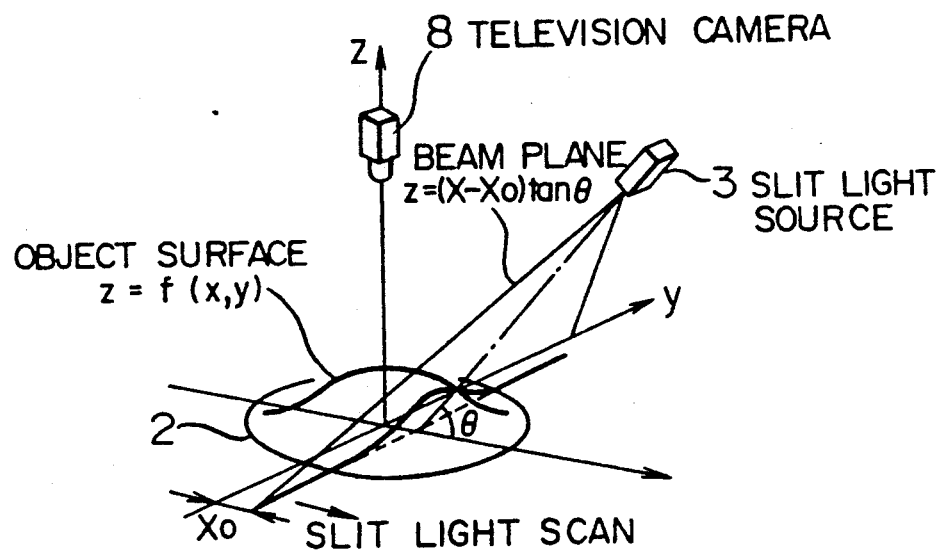
FIGS. 4A and 4C are diagrams showing the construction of the optical system according to the invention.
Figure 4B:
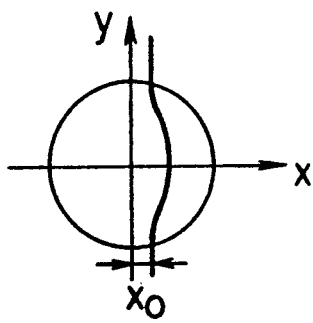
Figure 4C:
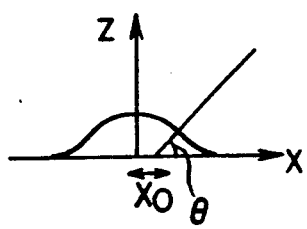

FIGS. 4A to 4C show the optical system of this invention and the object 2 to be measured with an object plane. $z=f(x,y)$ is mounted on an x-y plane or the reference plane 1. With a z-axis as the optical axis, the television camera 8 observes the object plane at a given angle, e.g., from directly above. The slit light 3a spreading in the direction of a y-axis is projected at an angle $\theta$ with respect to an x-axis from the slit light source 3 and it is scanned in the x-axis direction. At this time, the position of the slit light sources 3 is defined as a position $x = x_o$ at which the slit light 3a strikes against the reference plane 1 (the following discussion also holds even if the position of the slit light source 3 is defined on any plane provided that it is a plane parallel to the x-y plane. Here, the position of the slit light source is defined on the x-y plane for purposes of simplicity.) and therefore the object surface and the plane of the slit light beam are respectively defined by the following expressions:

Object surface: $z = f(x,y)$ (1)

Plane of light beam: $z = \{x - x_o\} \cdot \tan \theta$ (2)

Since the expressions (1) and (2) hold simultaneously on the line on which the light beam impinges on the object surface, the relation of the following expression holds:

$$x_o = x - \frac{f(x, y)}{\tan \theta} \quad (3)$$

The value u(x, y) of the composite image corresponding to the coordinates (x, y) is given by the then current position $x_o$ of the projection of the light beam onto the reference plane 1, so that if u(x, y) is set equal to $x_o$, the following expression holds:

$$u(x, y) = x - \frac{f(x, y)}{\tan \theta} \quad (4)$$

On the other hand, if $u_o(x, y)$ represents the composite image of the reference plane (x—y plane) from which the object 2 to be measured has been removed, the following expression holds by setting as setting $f(x, y) = 0$ in to equation (4):

$$u_o(x,y) = x \quad (5)$$

Therefore, the object profile $f(x, y)$ can be obtained in the form of the following expression from equations (4) and (5):

$$f(x, y) = \{u_o(x,y) - u(x,y)\} \cdot \tan \theta \quad (6)$$

It is to be noted that the following methods may be easily conceived as examples of the application of the present measuring principle. To begin with, the first exemplary application is a method which establishes two reference planes. More specifically, in addition to the previously mentioned reference plane, there is provided a second reference plane which is parallel to and separated by a distance d (the side close to and the other side away from the television camera are respectively designated as + and −) from the former and a composite image is similarly computed with respect to this reference plane. If the composite image with respect to the second reference plane is represented as $u_1(x, y)$, setting $f(x, y) = d$ in the expression (4), we obtain $$u_1(x, y) = x - \frac{d}{\tan \theta} \quad (7)$$

Therefore, the object surface $f(x, y)$ can be obtained from the expressions (4), (5) and (7) as follows:

$$f(x, y) = \frac{u_o(x, y) - u(x, y)}{u_o(x, y) - u_1(x, y)} \cdot d \quad (8)$$

Figure 15A:
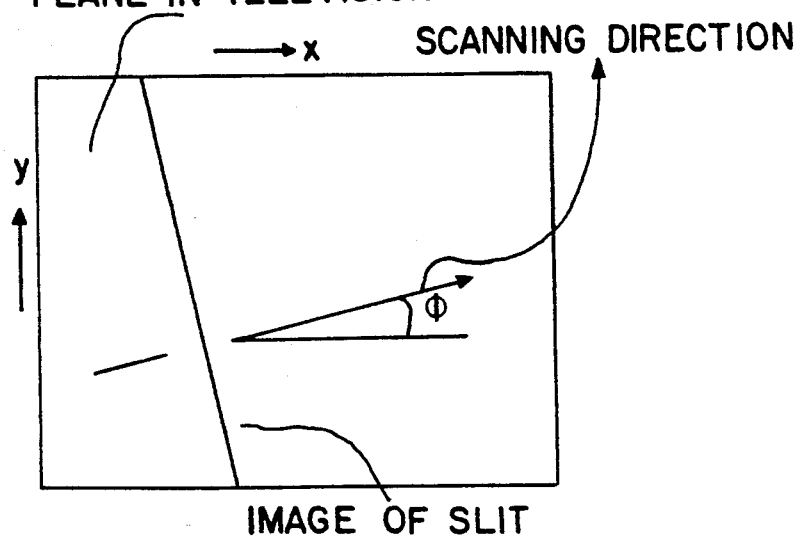
FIGS. 15A and 15B depiction of the relationship between these scanning directions of the split light beams and the raster direction of the television system.
Figure 15B:
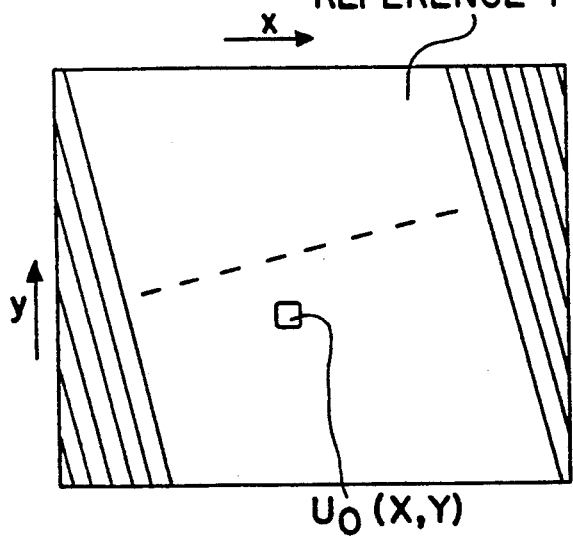

Also, as the second exemplary application, a method is conceivable which is so designed that instead of providing a reference plane physically, a composite image $u_o(x, y)$ with respect to a virtual reference plane is obtained by computation from the expression (5) and then it is substituted in the expression (6), thereby determining an object surface $f(x, y)$. However, if, in this case, the horizontal axis (the raster direction) of the television camera picture forms an angle $\Phi$ with the scan direction of the slit light source, it is necessary to rotate the image given by equation 5 by the angle $\Phi$ with reference to FIGS. 15A and 15B depiction of the relationship between these scanning directions of the split light beams and the raster direction of the television system and then use the resulting image given by the following equation:

$$u_o(x,y) = x \cos \Phi + y \sin \Phi \quad (9)$$

Next, the first embodiment of the invention will be described with reference to FIGS. 5 to 7.

FIG. 5 shows the construction of a three-dimensional shape measuring apparatus according to the first embodiment. An object 2 to be measured is mounted on a reference plane 1 serving as a basis of measurement. A slit light source 3 is mounted on a linear stage 4 to project a slit light 3a at an angle of projection $\theta$ onto the reference plane 1 and the object 2 to be measured. With the slit light source 3 mounted on it, the linear stage 4 is driven by a motor 6 controlled by a motor controller 5 and thus the slit light source 3 is moved at a constant speed in a direction parallel to the reference plane 1.

At this time, the position of the slit light source 3 is measured by a position sensor 7 incorporated in the linear stage 4, thereby enabling the position control by the motor 5.

The reference plane 1 and the object 2 to be measured are picked up by a television camera 8 arranged in a manner that its optical axis crosses the reference plane 1 at right angles and the resulting video signal is applied to a shape measuring apparatus 9.

The shape measuring apparatus 9 mainly includes a shape processing circuit 10 serving as image processing means for performing a shape processing by image composing, and a sequence controller 11 for applying a command to the motor controller 5 and performing a processing timing control for the shape processing circuit 10.

During the shape measurement, the shape measuring apparatus 9 drives the linear stage 4 through the sequence controller 11 responsive to an externally applied start signal and the slit light source 3 is set in its initial position. Thereafter, the scanning of the slit light source 3 is started.

The shape processing circuit 10 includes in its input section an image composing circuit 12 which will be described later so that at the same time that the scanning by the slit light source 3 is started, the video signal applied from the television camera 8 is processed from moment to moment and an image composing processing is performed such that the value of each of the picture elements within the image is represented by a stage position signal generated at the instant that the image of the slit light passes through that picture element. Then, upon the completion of one scanning of the slit light source 3, its result u(x, y) is transferred to an object surface composite image memory 13.

Then, after the object 2 has been removed from the reference plane 1, the sequence controller 11 returns the slit light source 3 to the initial position and the scanning by the slit light source 3 is again started. The image composing circuit 12 performs the same image composing processing as performed with respect to the object 2 for the reference plane 1 so that upon the completion of the scanning by the slit light source, its result $u_o(x, y)$ is transferred to a reference plane composite image memory 14.

After these image composing processings have been completed, in response to the commands from the sequence controller 11 the shape processing circuit 10 computes through a difference image processing circuit 15 an image representing the difference in value between every pair of corresponding picture elements of the images respectively stored in the object surface composite image memory 13 and the reference plane composite image memory 14 in the form of $$\{u_o(x,y) - u(x,y)\}$$

which in turn is calibrated or corrected in height profile through the use of a height correcting circuit 16 and the thus obtained resultant height profile data $$\{u_o(x,y) - u(x,y)\} \cdot \tan \theta$$

is stored in a three-dimensional shape memory 17. In response to a command from a higher-rank computer or a CAD system, the height profile data stored in the three-dimensional shape memory 17 is suitably transferred to the computer or the CAD system.

Figure 6:
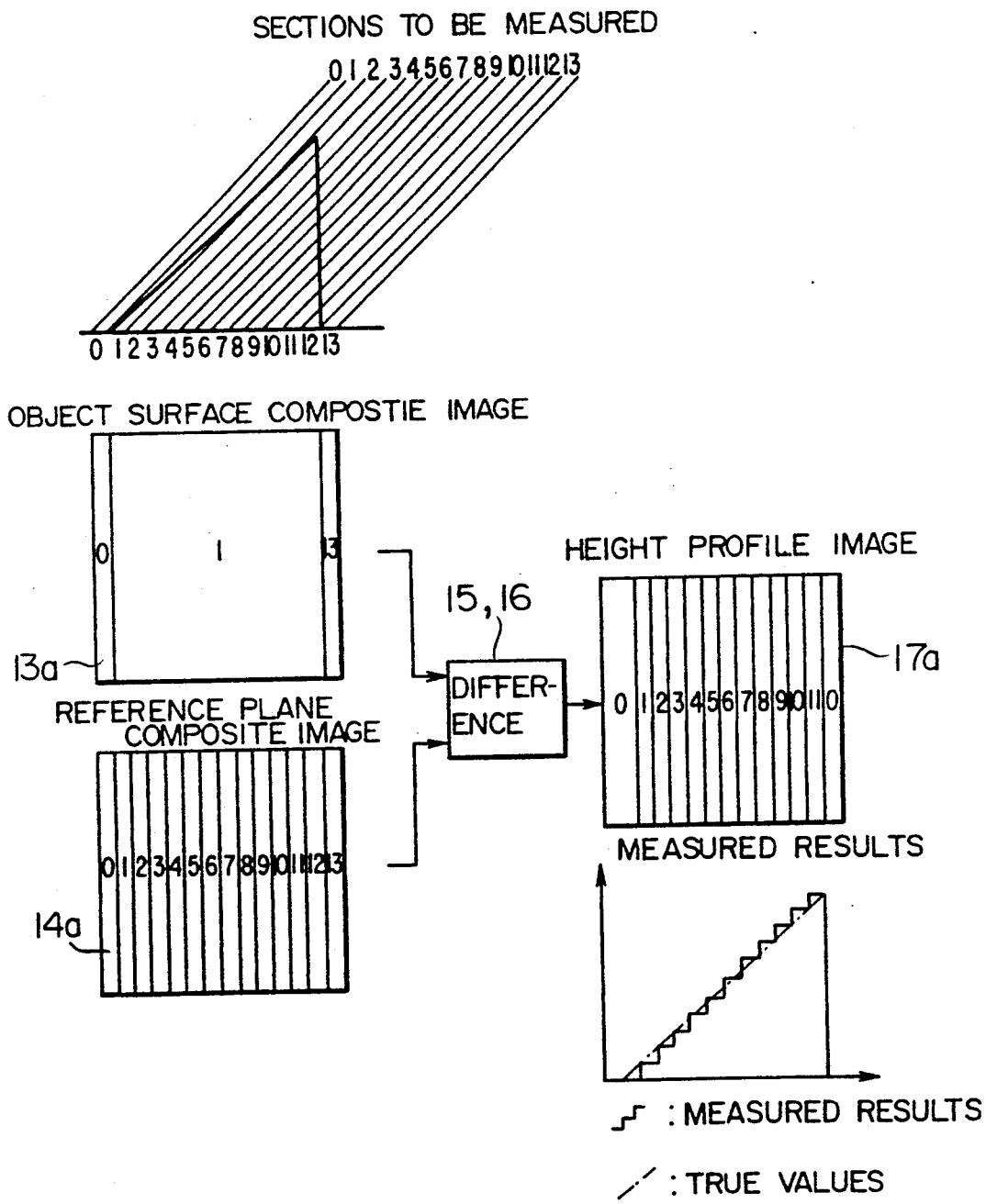
FIG. 6 is an example of the measurement of an inclined surface shape.

With the present embodiment, if, for example, the object 2 having the inclined surface of an angle close to the projection angle of the slit light is measured as shown in FIG. 6, due to the slope of the inclined surface being so close to the projection angle of the slit light, when the slit light reaches the position designated at "1" in FIG. 6, the whole inclined surface is brightened uniformly and the stored contents of the object surface composite image memory 13 become as shown by reference numeral 13a. The stored contents of the reference plane composite image memory 14 become as shown by reference numeral 14a. Therefore, these image data are processed by the difference image processing circuit 15 and the height correcting circuit 16 so that the resulting data stored in the three-dimensional shape memory 17 becomes as shown by reference numeral 17a. It will thus be seen that a satisfactorily high resolution is ensured even in the case of such shape having a surface close to the angle of the slit light.

It has been difficult in the past to extract the beam cutting lines from the image 13a and the application of the optical cutting method to such inclined surface cannot provide the required measuring accuracy and spatial resolution. In accordance with the present embodiment, even in the case of such an inclined surface the measurement can be effected with a measuring accuracy and spatial resolution of the order of the beam width or the sampling pitch of the slit light and generally the desired shape measurement can be realized irrespective of the shape of an object to be measured.

Figure 7:
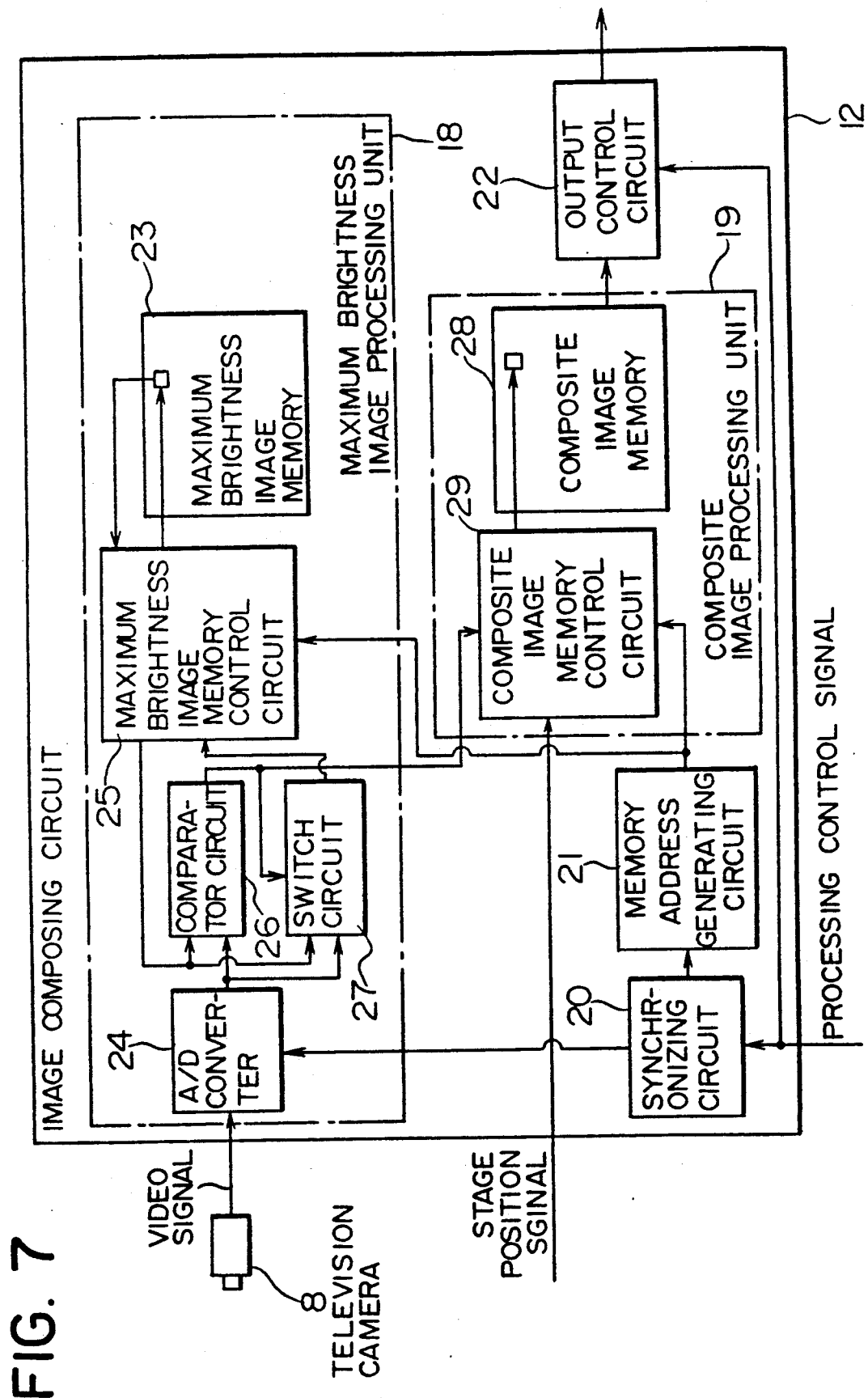
FIG. 7 is a block diagram showing in detail the image processing circuit of FIG. 5.

FIG. 7 is a block diagram showing an example of the image processing circuit 12 forming a constituent element of the shape measuring apparatus 9.

The image composing circuit 12 includes a maximum brightness image processing unit 18 for processing the video signal applied from the television camera 8 to compute the brightness of each of the picture elements at the instant that it attains the maximum brightness, and a composite image processing unit 19 for performing an image composing processing such that the value of each picture element represents the time instant that the brightness of each picture element becomes maximum, as well as a synchronizing circuit 20, a memory address generating circuit 21 and an output control circuit 22 for the purpose of controlling the former.

The maximum brightness image processing unit 18 includes mainly a maximum brightness image memory 23 composed of a buffer memory for maximum brightness image processing purposes as well as an A/D converter circuit 24 responsive to the timing signal generated from the synchronizing circuit 20 to digitize the video signal by A/D conversion, a maximum brightness image memory 25 for controlling the reading and writing of data into the maximum brightness memory addresses designated by the memory address generating circuit 21, a comparator circuit 26 for comparing the values of each pair of corresponding picture elements of the image inputted from the television camera and the image in the maximum brightness image memory to select and output the greater of the two values, and a switch circuit 27.

On the other hand, the composite image processing unit 19 includes mainly a composite image memory 28 for storing the result of composite image processing as well as a composite image memory control circuit 29 having a function of responding to the output signal from the comparator circuit 26 of the maximum brightness image processing unit 18 so that when the input signal level from the television camera is greater than the value of the picture element at the corresponding address of the maximum brightness image memory 23, the stage position signal is written into the composite image memory 28.

This circuit functions so that starting at the timing of beginning of the processing with the maximum brightness image memory 23 and the composite image memory 28 being cleared to zero, while digitizing the input video signal from the television camera by using the A/D converter circuit 24, the value of each of the picture elements of the video signal is compared with the value of that picture element in the maximum brightness image memory 23 which corresponds to the position of the former picture element so that only when the value of the video signal is greater, is the value of the picture element in the maximum brightness image memory 13 updated by the value of the video signal and simultaneously the stage position signal is written into the corresponding picture element of the composite image.

In this way, during the time that is commanded by the externally applied processing control signal, the above-mentioned processing is performed so that the previously mentioned desired image is formed in the composite image memory 28 upon the completion of the processing. The thus processed composite image is transferred to the following processing circuit through the output control circuit 22.

While, in the above-described embodiment, the composite image of the reference plane 1 is formed during the measurement, it is necessary to form the composite image of the reference plane 1 only once and therefore the initially formed composite image of the reference plane 1 can be used as such during the second and subsequent measurements. In addition, the composite image of the reference plane 1 is so simple in construction that the shape processing circuit 10 may be provided with an additional processing function such that a virtual reference plane is obtained by calculation from equation (5) to produce and store its composite image in the reference plane composite image memory 14.

Further, whereas in the above-described embodiment a single reference plane is provided, a second reference plane may be provided in addition to the reference plane 1. The second reference plane (not shown) is positioned between the reference plane 1 and the slit light source 3 and at a distance d from the reference plane 1.

Figure 8:
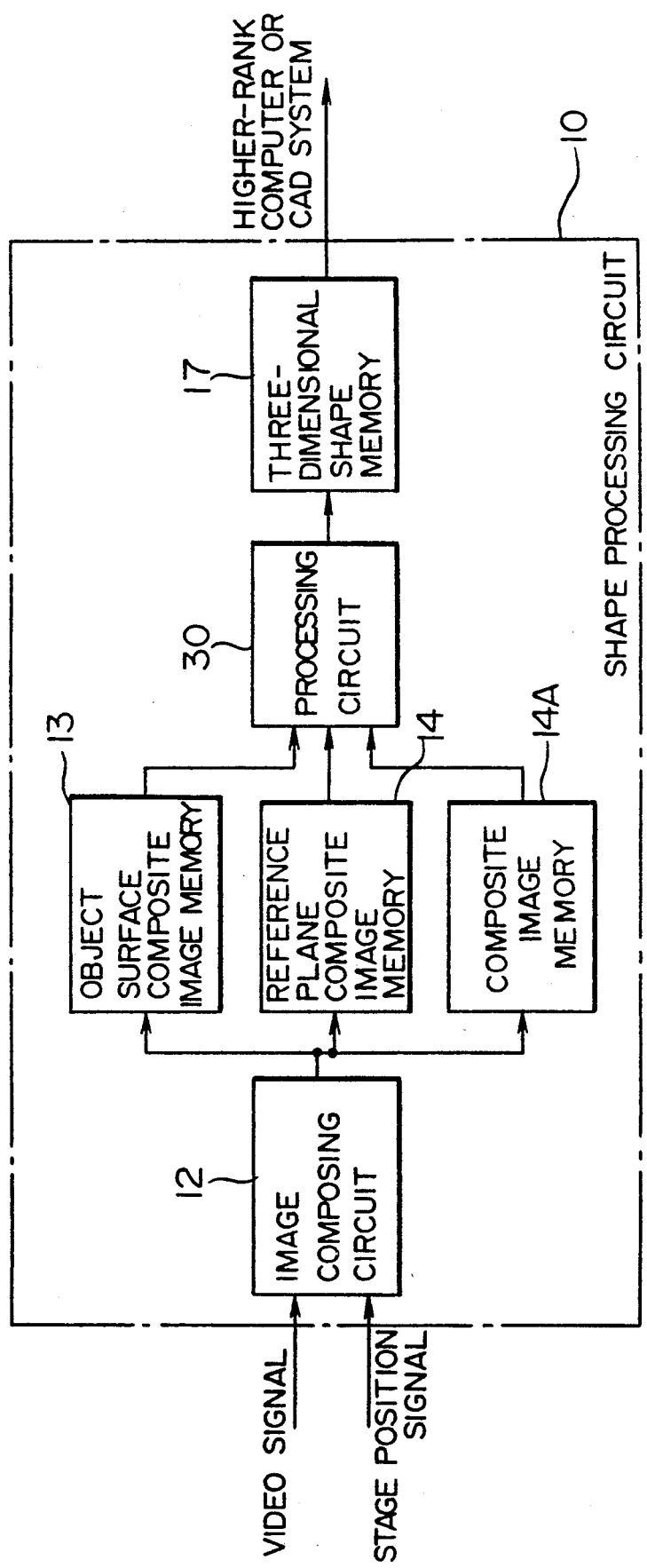
FIG. 8 is a block diagram showing another example of the shape processing circuit.

In this case, as shown in FIG. 8, a composite image $u_1(x, y)$ according to the second reference plane is formed in the same way as mentioned previously by the image composing circuit 12 and a composite image memory 14A for storing this composite image is provided in addition to the object surface composite image memory 13 and the reference composite image memory 14. Also, the difference image processing circuit 15 and the height correcting circuit 16 are replaced with a processing circuit 30 for performing the calculation of the previously mentioned equation (8).

A second embodiment of the invention will now be described. Whereas in the first embodiment the position of the slit light source 3 at the instant that the slit light passes through each picture element is coded as the value of that picture element, in accordance with the second embodiment the time at that instant is coded and its measuring principle is basically the same as the first embodiment. In FIGS. 4A to 4C, the slit light source 3 projects at the angle $\theta$ the slit light 3a spreading in the y-axis direction to scan at a constant speed v in the x-direction. As a result, those expressions corresponding to equations (2) to (7) and (9) in the first embodiment are also respectively obtained by the similar procedures in the second embodiment in the form of the following expressions (2a) to (7a) and (9a):

$$\text{Beam plane: } z = \{x - (x_o + vt)\} \cdot \tan \theta \quad (2a)$$

$$t = \frac{1}{v}\left( (x - x_o) - \frac{f(x, y)}{\tan \theta} \right) \quad (3a)$$

$$u(x, y) = \frac{1}{v}\left( (x - x_o) - \frac{f(x, y)}{\tan \theta} \right) \quad (4a)$$

$$u_o(x, y) = \frac{1}{v}(x - x_o) \quad (5a)$$

$$f(x, y) = \{u_o(x, y) - u(x, y)\} \cdot v \tan \theta \quad (6a)$$

$$u_1(x, y) = \frac{1}{v}\left( (x - x_o) - \frac{d}{\tan \theta} \right) \quad (7a)$$

where t is the amount of time elapsed after the slit light beam scanning begins and v is the scanning speed of the slit light beam.

It is to be noted that equations (1), (8) and (9) of the first embodiment can also be used as such in the second embodiment.

Figure 9:
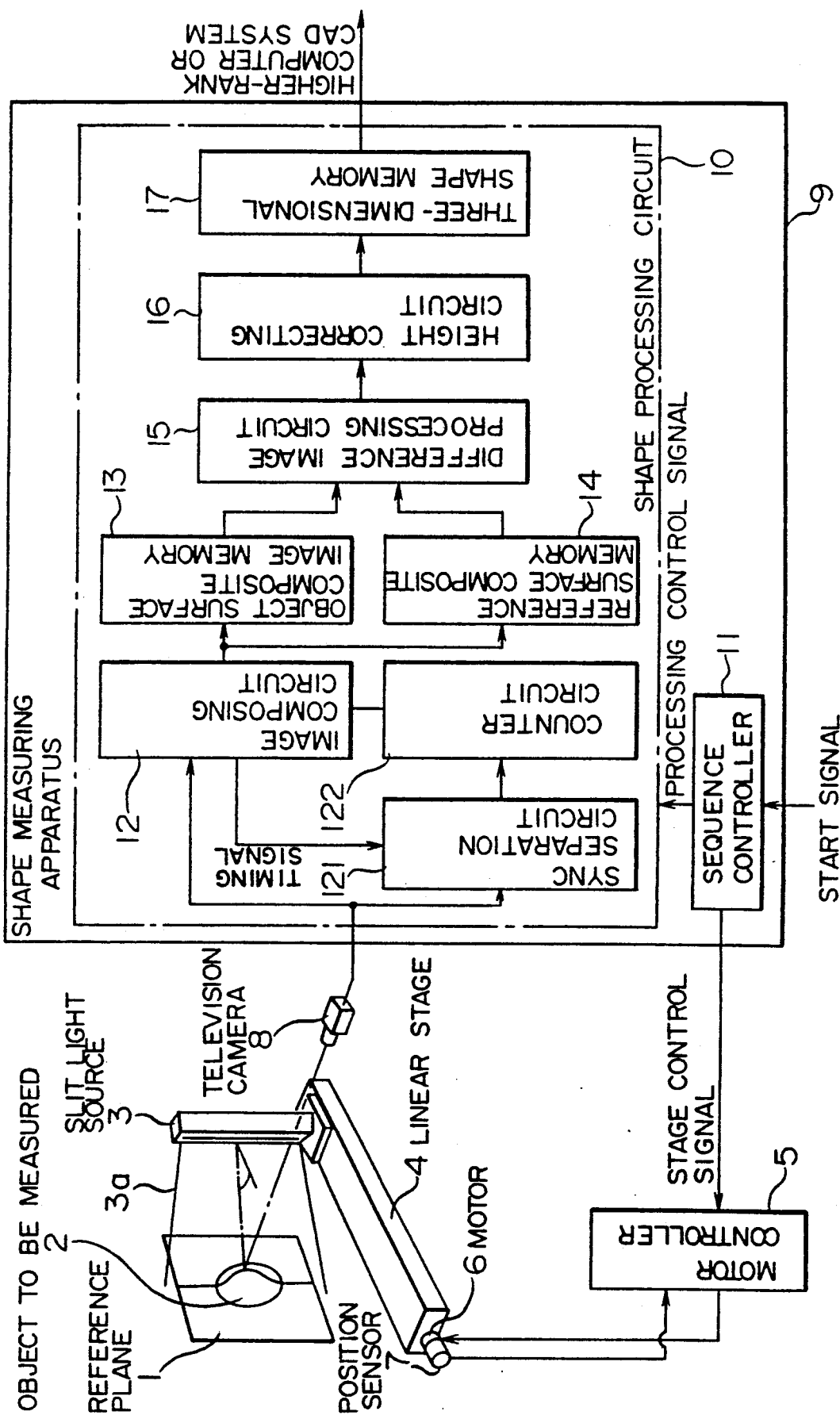
FIG. 9 is a block diagram showing the construction of the three-dimensional shape measuring apparatus according to the second embodiment of the invention.

FIG. 9 is a schematic block diagram of the three-dimensional shape measuring apparatus according to the second embodiment which is so constructed that the timing signals for an image composing circuit 12 are produced by separating the vertical synchronizing signals of the video signal applied from a television camera 8 by a sync separation circuit 121 and counting the separated signals by a counter circuit 122 starting at the same time that the scanning by a slit light source 3 is begun.

A shape processing circuit 10 includes the image composing circuit 12 in the input section whereby an image composing processing is performed so that simultaneously with the beginning of the scanning of the slit light source 3, the video signal inputted from the television camera 8 is processed from moment to moment so as to represent the value of each of the picture elements in the image by the time instant at which the image of the slit light passes through that picture element and upon the completion of each scanning of the slit light source 3 the processing result u(x, y) is transferred to an object surface composite image memory 13.

Then, after the object 2 to be measured has been removed from a reference plane 1, a sequence controller 11 returns the slit light source 3 to the initial position and the scanning by the slit light source 3 is again started. The image composing circuit 12 performs on the reference plane 1 the same image composing processing as performed on the object 2 so that upon completion of the scanning by the slit light source 3 the processing result $u_o(x, y)$ is transferred to a reference plane composite image memory 14.

After the completion of these image composing processings, the shape processing circuit 10 responds to the command from the sequence controller 11 to compute by a difference image processing circuit 15 an image $$\{u_o(x, y) - u(x, y)\}$$

representing the difference in the values of the corresponding picture elements of the image in the object surface composite image memory 13 and the image in the reference plane composite image memory 14 and then the height profile is corrected by means of a height correcting circuit 16, thereby storing the resulting height profile data $$\{u_o(x, y) - u(x, y)\} \cdot v \cdot \tan \theta$$

in a three-dimensional shape memory 17.

In response to the command from a higher-rank computer or a CAD system, the height profile data stored in the three-dimensional shape memory 17 is suitably transferred to the computer or the CAD system.

As in the case of the first embodiment shown in FIG. 6, also in this embodiment second the stored contents of the object surface composite image memory 13 and the reference plane composite image memory 14 become as shown at numerals 13a and 14a, respectively. As a result, these image data are processed by the difference image processing circuit 15 and the height correcting circuit 16 so that the height profile image shown at numeral 17a is obtained and stored in the three-dimensional shape memory 17.

Whereas in the embodiment of FIG. 9 a single reference plane is provided, a second reference plane may be provided in addition to the reference plane 1 as in the embodiment of FIG. 8. The second reference plane (not shown) is arranged between the reference plane 1 and the slit light source 3 so as to be separated from the reference plane 1 by a distance d.

Figure 10:
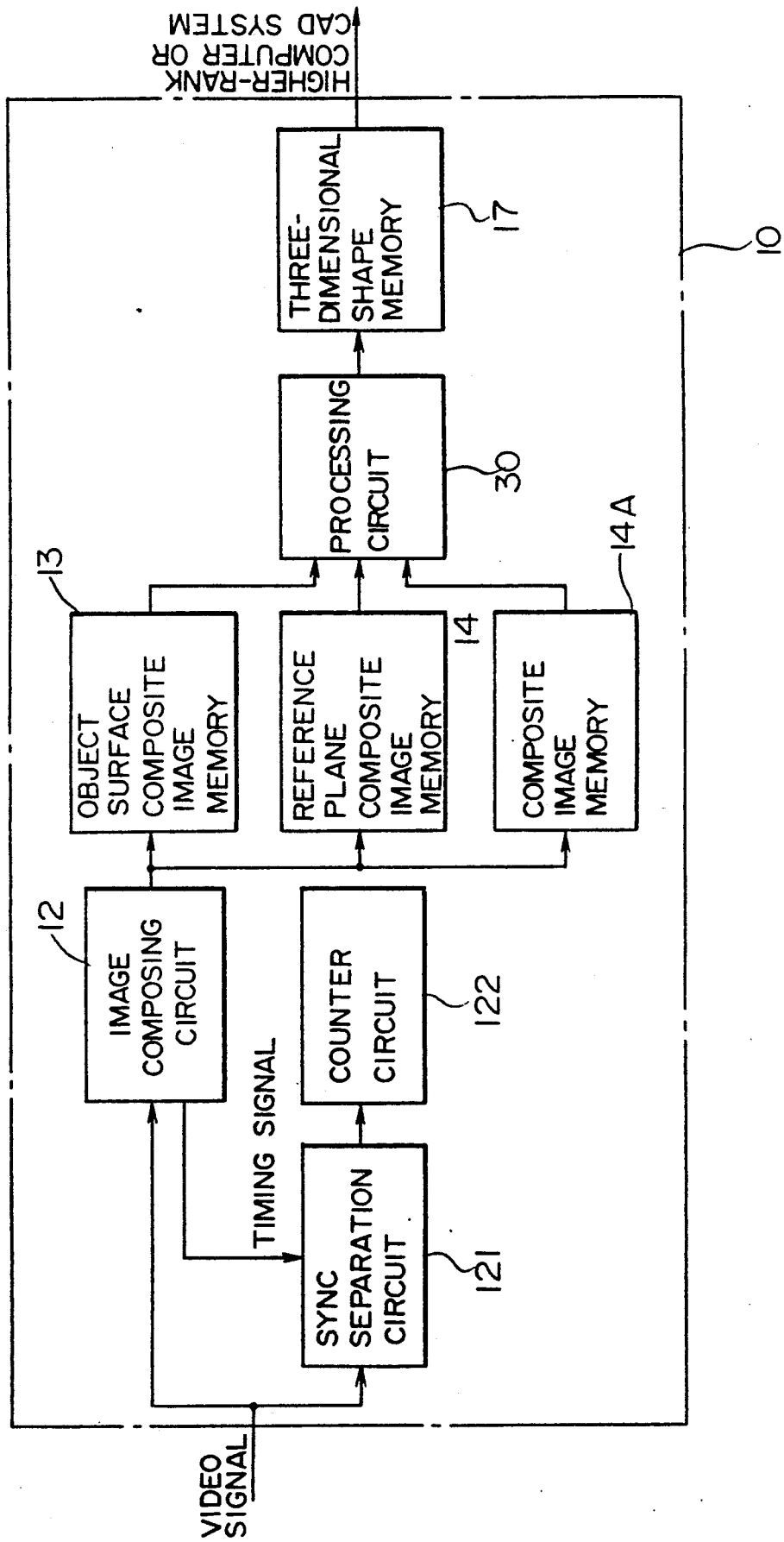
FIG. 10 is a block diagram showing another example of the shape processing circuit.

In this case, as shown in FIG. 10, the shape processing circuit 10 is designed so that a composite image $u_1(x, y)$ of the second reference plane is formed by the image composing circuit 12 in a like manner as mentioned previously and a composite image memory 14a for storing it is provided in addition to the object surface composite image memory 13 and the reference plane composite image memory 14. Also, a processing circuit 30 for performing the calculation of the previously mentioned equation (8) is provided in place of the difference image processing circuit 15 and the height correcting circuit 16.

Next, a third embodiment of the invention will be described. The measuring principle of this embodiment will be described first conceptually with reference to FIG. 11.

Figure 11:
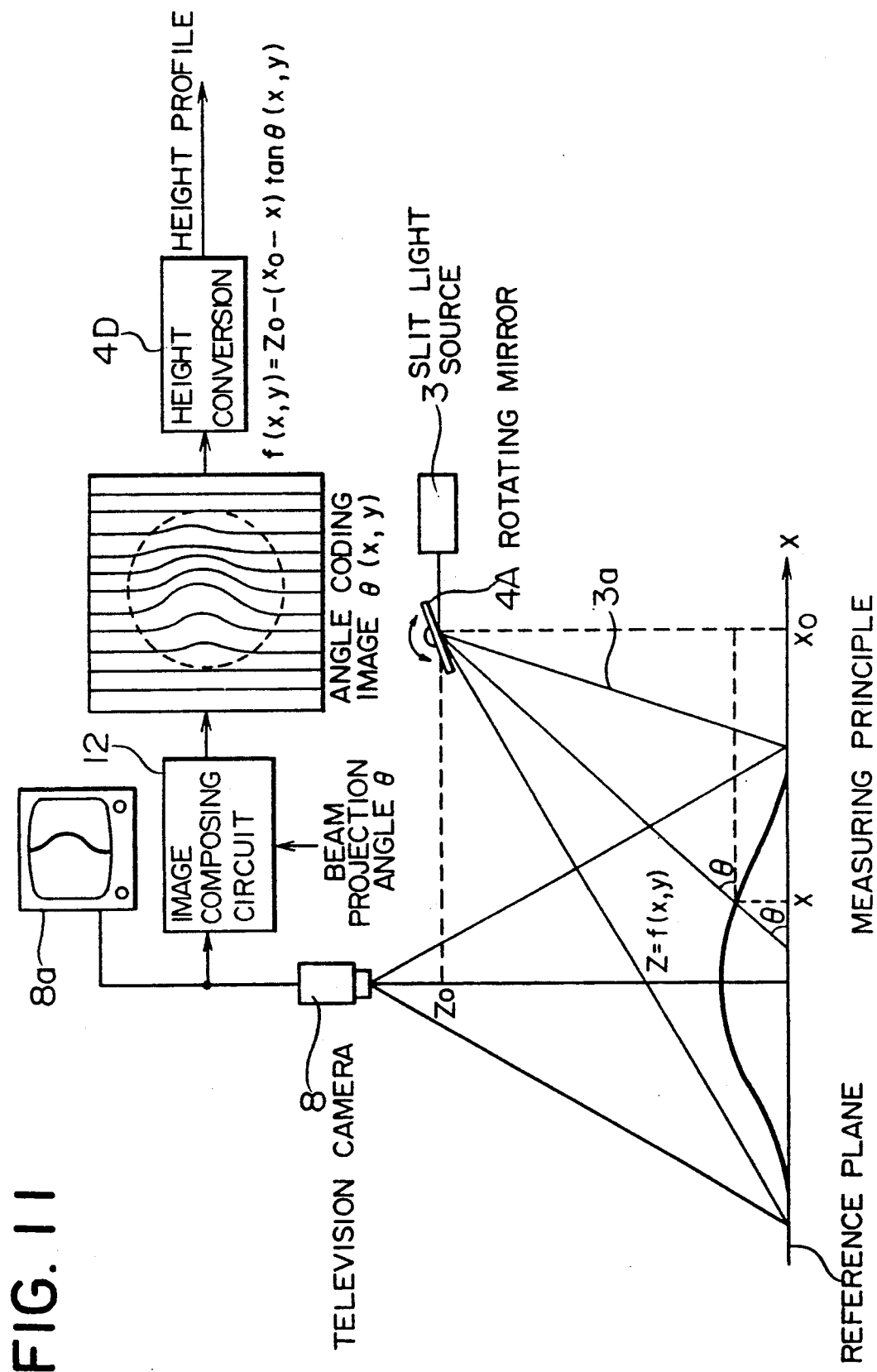
FIG. 11 is a digram showing the measuring principle of a third embodiment of the invention.

As shown in FIG. 11, a slit light 3a spreading in the vertical direction to the paper plane is projected obliquely from above onto the surface of an object 2 to be measured which is placed on a reference plane 1 and the object surface is picked up by a television camera 8 from for example just above the object 2 to be measured while moving the slit light 3a transversely to the paper plane by use for example of a rotating mirror 4A. At this time, the manner in which the linear reflected pattern of the slit light on the object surface is moved transversely in the image is observed on a television monitor 8a connected to the television camera 8.

As mentioned previously, the linear shape of the reflected pattern of the slit light 3a reflects the irregularity information of the object surface and the conventional optical cutting method measures the three-dimensional shape of the object to be measured by extracting the linear shape of the reflected pattern from moment to moment and reconstructing the extracted linear shapes.

In accordance with the present invention, on the basis of the video signal generated from the television camera 8 which picks up the manner in which the linear reflected pattern of the slit light 3a is moved over the object surface, a composite image is formed in which the value of each of the picture elements in the image represents the slit light projection angle at the instant that the slit light passes through the position on the object surface corresponding to that picture element.

The resulting composite image is such that the value of each of the picture elements corresponds to the angle of elevation obtained when the center of the slit light rotation of the rotating mirror 4A is looked up from the position on the object surface corresponding to the picture element. Thus, if the composite image is represented in terms of $\theta(x, y)$ by using the coordinate system $(x, y)$ of the corresponding object surface, the profile $f(x, y)$ of the object surface can be obtained from the following equation by a simple geometrical calculation based on FIG. 11:

$$f(x, y) = z_0 - (x_0 - x) \cdot \tan \theta(x, y) \quad (10)$$

It is to be noted that the following measuring methods may be easily conceived as examples of the application of the above-mentioned measuring principle. To begin with, the first exemplary application is a method in which the above-mentioned measurement is made with respect to the reference plane 1 and the resulting composite image is utilized to eliminate the the parameter $x_o$ or $z_o$. In other words, by setting $f(x, y) = 0$ in equation (10), the composite image $\theta_o(x, y)$ of the reference plane 1 becomes as follows:

$$\tan \theta_o(x, y) = \frac{z_0}{x_o - x} \quad (11)$$

Therefore, by eliminating the parameter $z_o$ or $z_o$ from equation (10), the object surface profile $f(x, y)$ is determined by the relations of the following equations:

$$f(x, y) = \{\tan \theta_o(x, y) - \tan \theta(x, y)\} \cdot (x_o - x) \quad (12)$$

$$f(x, y) = \left(1 - \frac{\tan \theta(x, y)}{\tan \theta_o(x, y)}\right) \cdot z_o \quad (13)$$

On the other hand, the second exemplary application is a method in which the above-mentioned measurement is made with respect to two reference planes $f(x, y) = 0$ and $f(x, y) = d$ and the resulting composite images are utilized to eliminate both of the parameters $x_o$ and $z_o$. In other words, as regards the composite image $\theta_1(x, y)$ of the second reference plane, the following equation is obtained by setting $f(x, y) = d$ in equation (10):

$$\tan \theta_1(x, y) = \frac{z_o - d}{x_o - x} \tag{14}$$

Therefore, by substituting the relations of equations (11) and (14) in equation (10) to eliminate the parameters $x_o$ and $z_o$, $f(x, y)$ is determined in the form of the following equation:

$$f(x, y) = \frac{\tan \theta_o(x, y) - \tan \theta(x, y)}{\tan \theta_o(x, y) - \tan \theta_1(x, y)} \cdot d \tag{15}$$

It is to be noted that while, in accordance with the invention, the surface of an object to be measured is coded in terms of slit light projection angles, as the means for this purpose, the slit light projection angles need not always be measured directly and it is possible to temporarily code the surface of the object to be measured by the equivalent values such as the rotation angles of the rotating mirror or the times after the start of the scanning of the rotating mirror on the condition that the rotation speed of the rotating mirror is contant and then convert them to slit light projection angles by processing.

Further, as will be seen from equations (10) to (15), the composite image $\theta(x, y)$ coded in terms of the slit light projection angles is generally used in the form of its tangent $\tan \theta(x, y)$ in all the subsequent shape processing operations and therefore during the initial image composing period coding may be effected directly in terms of the tangents of slit light projection angles in place of the slit light projection angles.

The third embodiment of the invention will now be described with reference to FIGS. 12 and 13.

Figure 12:
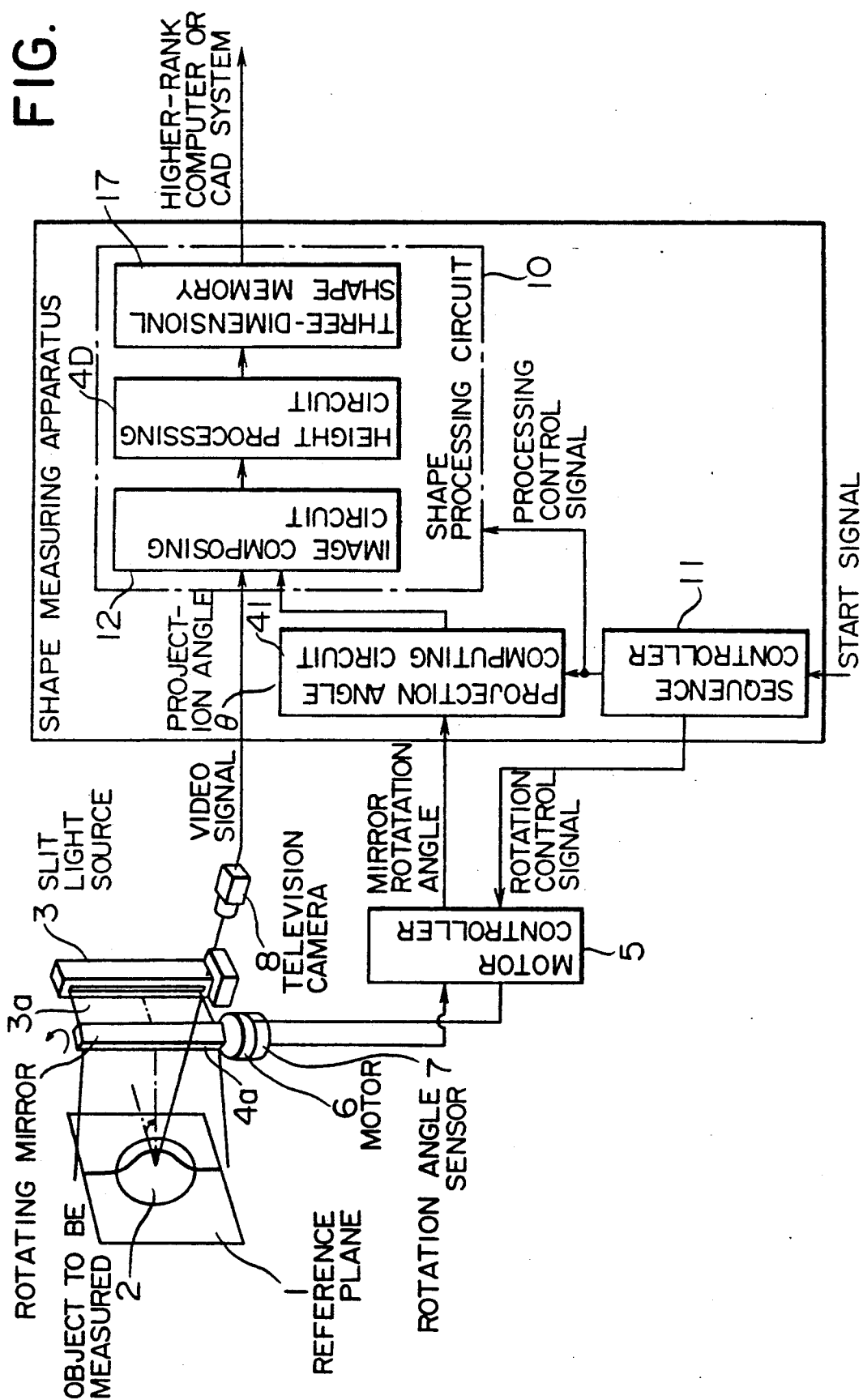
FIG. 12 is a schematic block diagram showing the construction of a three-dimensional shape measuring apparatus according to the third embodiment.

FIG. 12 shows the construction of a three-dimensional shape measuring apparatus according to the third embodiment. An object 2 to be measured is placed on a reference plane 1 used as a reference for measurements. The slit light emitted from a slit light source 3 is reflected by a rotating mirror 4A and projected onto the object 2 obliquely from above. The rotating mirror 4A is driven by a motor 6 controlled by a motor controller 5 in such a manner that the slit light 3a scans all over the surface of the object 2 on the reference plane 1.

At this time, it is assumed that the position $(x_o, z_o)$ of the central axis of rotation of the rotating mirror 4A relative to the reference plane 1 is measured accurately. Also, the angle formed by the rotating mirror 4A with the reference plane 1 is detected by a rotation angle sensor 7 operatively mounted on the shaft of the motor 6 and applied to a shape measuring apparatus 9 through the motor controller 5, thereby computing the slit light projection angle $\theta$ varying from moment to moment with respect to the object 2 to be measured.

On the other hand, the surface of the object 2 is picked up by a television camera 8 arranged so that its optical axis crosses the reference plane 1 at right angles and the resulting video signal is applied to the shape measuring apparatus 9.

The shape measuring apparatus 9 mainly includes a shape processing circuit 10 serving as image processing means for performing a shape processing by image combining, a beam projection angle computing circuit 33 for computing a slit light beam projection angle $\theta$ from the output of the rotation angle sensor 7 and applying it to the shape processing circuit 10, and a sequence controller 11 for applying commands to the motor controller 5 and controlling the timing of processing of the shape processing circuit 10.

When making the shape measurement, the shape processing apparatus 9 drives the motor 6 through the sequence controller 11 in accordance with the externally applied start signal and the rotating mirror 4A is set in the initial position. Thereafter, the rotation of the rotating mirror 4A is started and the scanning by the slit light source 3a is started.

The shape processing circuit 10 includes an image composing circuit 12 in the input section whereby during each scanning period of the slit light source 3a, an image composing processing is performed so that upon the starting of the scanning by the slit light source 3a, the video signal applied from the television camera 8 is processed from moment to moment and the beam projection angle at the instant that the slit light passes through each of the picture elements in the image is read by the beam projection angle computing circuit 41 to represent the value of each picture element.

After the processing of the composite image $\theta(x, y)$ has been completed, in accordance with the command from the sequence controller 11 the shape processing circuit 10 computes a height profile $f(x, y)$ by means of a height processing circuit 40 in accordance with equation (10) and the resulting data is stored in a three-dimensional shape memory 17.

In accordance with the command from a higher-rank computer or a CAD system, the height profile data stored in the three-dimensional shape memory 17 is suitably transferred to the computer or the CAD system.

In accordance with this embodiment third, if, for example, the measurement is made on the object 2 to be measured which has an inclined surface of an angle close to the beam projection angle of the slit light as shown in FIG. 13, the slope of the inclined surface is very close to the projection angle of the slit light so that when the slit light arrives at the position designated as "1" in FIG. 13, the whole inclined surface is brightened uniformly. However, if the resulting angle coded composite image is processed in accordance with equation (10), such measured results as shown in FIG. 13, are obtained. From this it will be seen that a satisfactorily high resolution can be ensured even in the case of a shape having a surface close to the angle of a slit light.

While in the past it has been difficult to extract the beam cutting lines from such image as explained previously and it has been impossible to expect the desired measuring accuracy and spatial resolution by the application of the optical cutting method to the measurement of such inclined surface, in accordance with this embodiment a measuring accuracy and a spatial resolution of about the same degree as the beam width or sampling pitch of a slit light are possible and generally the desired shape measurements can be effected irrespective of the shapes of objects to be measured.

Whereas in the above-described embodiment, the height processing circuit 34 performs the calculation of equation (10), the parameter $z_o$ or $x_o$ in equation (10) may be eliminated so as to enhance the measuring accuracy.

Figure 14:
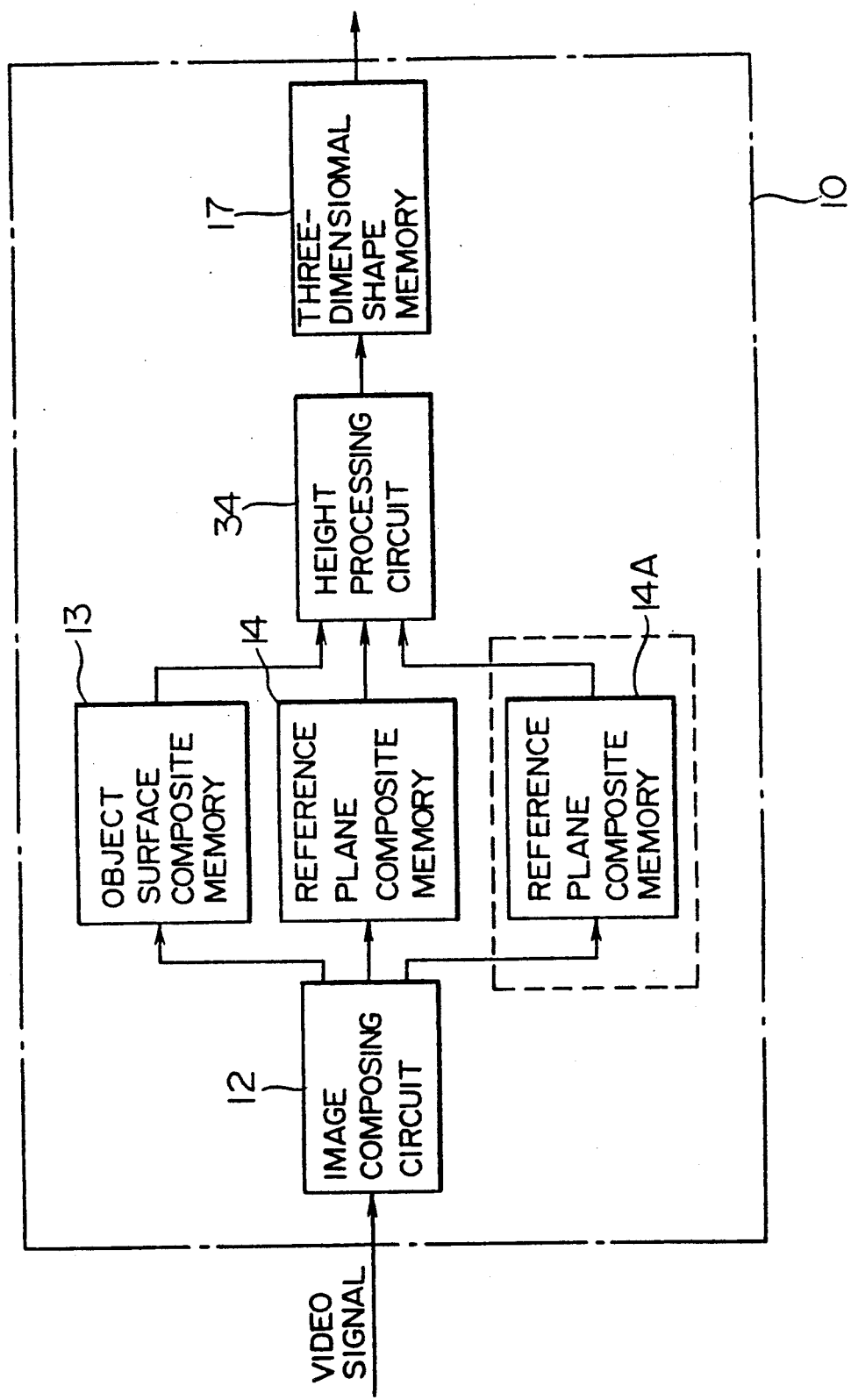
FIG. 14 is a block diagram showing another example of the shape processing circuit.

In this case, a composite image is also determined with respect to the reference plane 1 in a similar manner as the object to be measured and it is represented as $\theta(x, y)$. Then, as shown in FIG. 14, the composite image $\theta_o(x, y)$ of the object to be measured and the composite image $\theta_o(x, y)$ of the reference plane are temporarily stored in the object surface composite image memory 13 and the reference plane composite image 14, respectively, and then the calculation of equation (12) or (13) is performed by the height processing circuit 34, thereby determining the three-dimensional shape.

Also, both of the parameters $z_0$ and $x_0$ in equation (10) may be eliminated. In this case a second reference plane (which is parallel to and separated by a distance d from the reference plane 1) is provided in addition to the reference plane 1 so that a composite image $\theta_o$ of the object 2 to be measured, a composite image $\theta_o(x, y)$ of the reference plane 1 and a composite image $\theta_1(x, y)$ of the second reference plane are all produced in a similar manner and are temporarily stored in the object surface composite image memory 13, the reference plane composite image memory 14 and a second reference plane composite image memory 14A. Then, the calculation of equation (15) is performed by the height processing circuit 34 to determine a three-dimensional shape.

It is to be noted that the composite images of the reference plane 1 and the second reference plane need not be produced again and therefore the initially produced composite images can be used as such during the second and subsequent measurements. Also, in view of the fact that the composite images of the reference plane 1 and the second reference plane are both simple in construction, the shape processing circuit 10 may be provided with processing functions such that virtual reference planes are obtained by calculation in accordance with equations (11) and (14) to produce their respective composite images and store them in the memories 14 and 14A, respectively.

What is claimed is:

1. A method of measuring a three-dimensional curved surface shape, comprising the steps of:
    causing a linear slit light to scan a surface of an object to be measured on a reference plane;
    producing video signals by picking up the surface of said object using a television camera;
    inputting said video signals corresponding to a plurality of picture elements into a memory means;
    forming a composite image of the surface of said object by composing an image in which successive video signals of the same picture element are compared in magnitude to renew the same picture element in said memory means using as a value thereof information relating to scanning of said slit light at a time of application of the larger of said compared video signals and to thereby represent a value of each picture element in said memory means by information relating to scanning of said slit light at a time when said slit light passes respectively through a measuring point corresponding to each of said picture elements; and
    measuring a three-dimensional curved surface shape of said object in accordance with said composite image.

2. A measuring method according to claim 1, wherein said television camera is aimed in a direction perpendicular to said reference plane.

3. A measuring method according to claim 2, wherein the step of measuring a three-dimensional curved surface shape of said object comprises measuring said three-dimensional curved surface in accordance with the difference between the values of the picture elements for said composite image of said object and the values of the corresponding picture elements for a preliminarily determined composite image of said reference plane.

4. A measuring method according to claim 3, wherein the step of causing a linear slit light to scan the surface of said object comprises causing said linear slit light to scan linearly the surface of said object, said linear slit light being projected from a direction which forms an angle $\theta$ with said reference plane, wherein $\theta$ is not equal to 90°.

5. A measuring method according to claim 2, wherein the step of causing a linear light to scan the surface of said object comprises the steps of causing said linear slit light to scan the surface of said object by reflection from a rotatable mirror and
    measuring angles of projection of said slit light,
    whereby information relating to scanning of said slit light is represented by a slit light projection angle at an instant when said slit light passes through a measuring point corresponding to one of said picture element of by a value equivalent thereto.

6. An apparatus for measuring a three-dimensional curved surface shape comprising:
    slit light projecting means for projecting a linear slit light onto a surface of an object to be measured on a first reference plane from a direction forming an angle $\theta$ with said first reference plane which is not equal to 90°;
    slit light scanning means for causing said linear slit light to scan the surface of said object on said first reference plane;
    a television camera for picking up the surface of said object from a direction different from the direction of projection of said slit light projecting means;
    image composing means for composing a composite image of the surface of said object by composing an image in which successive video signals of the same picture element are applied from said television camera and compared in magnitude to renew said same picture element in a memory means by using as a value thereof information relating to scanning of said slit light at a time of application of the larger of said compared video signals, whereby a value of each of said picture elements in said memory means is represented by said respective information relating to scanning of said slit light at an instant when said slit light passes through a measuring point corresponding to said respective picture element; and
    image processing means for measuring a three-dimensional curved surface shape in accordance with said composite image of said object.

7. A measuring apparatus according to claim 6, wherein said image composing means comprises:
    maximum brightness memory means for storing a maximum level of said video signal for each of said picture elements during a predetermined period of time;
    maximum brightness image procssing means for comparing said video signal and the signals stored in said maximum brightness memory means for each picture element thereof and writing a value of the greater one thereof in said maximum brightness memory means;
    composite image memory means for storing a value of a synchronizing signal or external input signal at an instant when the magnitude said video signal is greatest for each of said picture elements during a predetermined time period; and composite image processing means for storing in said composite image memory means an instantaneous synchronizing signal count value or external signal value for each picture signal count value or external signal value for each picture element for which said maximum brightness memory means determines that said video signal is greater than said signal stored in said maximum brightness memory means.

8. A measuring apparatus according to claim 6, wherein said slit light scanning means linearly scans said slit light all over the surface of said object and wherein said image processing means measures a three-dimensional curved surface shape of said object in accordance with the difference between the values of the picture elements of said composite image of said object and the values of the picture elements of a preliminarily determined composite image of said first reference plane.

9. A measuring apparatus according to claim 8, wherein said television camera is aimed in a direction perpendicular to said first reference plane.

10. A measuring apparatus according to claim 8, wherein said image processing means determines a three-dimensional shape f(x, y) of said object on the basis of a composite image u(x, y) of said object, a composite image $u_o(x, y)$ of said first reference plane and a composite image $u_1(x, y)$ with respect to a second reference plane which is parallel to and separated by a distance d from said first reference plane in accordance with the equation.

$$f(x, y) = \frac{u_o(x, y) - u(x, y)}{u_o(x, y) - u_1(x, y)} d,$$

where x and y are the positional coordinates of the picture elements.

11. A measuring apparatus according to claim 8, wherein said image processing means determines a three-dimensional shape f(x, y) of said object on the basis of a composite image u(x, y) of said object, a composite image $u_o(x, y)$ of said first reference plane, a slit light projection angle $\theta$ with respect to said first reference plane and a slit light scanning speed v in accordance with the equation:

$$f(x, y) = \{u_o(x, y) - u(x, y)\} v \tan \theta,$$

where x and y are the positional coordinates of the picture elements.

12. A measuring apparatus according to claim 8, further comprising slit light angle measuring means for measuring a projection angle of said slit light, wherein said slit light scanning means rotates said slit light projecting means within a plane of said slit light beam about an axis of rotation consisting of a straight line parallel to said first reference plane to scan said slit light all over the surface of said object, and said formation relating to scanning of said slit light is a slit light projection angle or a value equivalent thereto.

13. A measuring apparatus according to claim 12, wherein said image processing means determines a three-dimensional shape f(x, y) of said object according to two-dimensional coordinates x and y on the basis of a composite image $\theta(x, y)$ of said object and a horizontal displacement $x_o$ and vertical displacement $z_o$ of said axis of rotation of said slit light relative to an origin of said first reference plane in accordance with the equation:

$$f(x, y) = z_o - (x - x_o) \tan \theta(x, y)$$

14. A measuring apparatus according to claim 12, wherein said image processing means determines a three-dimensional shape f(x, y) of said object according to two-dimensional coordinates x and y at least on the basis of a composite image u(x, y) of said object surfaces and a preliminarily determined composite image $\theta_o(x, y)$ of said first reference plane.

15. A measuring apparatus according to claim 12, wherein said large processing means determines a three-dimensional shape f(x, y) of said object according to two-dimensional coordinates x and y on the basis of a composite image $\theta(x, y)$ of said object, a composite image $\theta_o(x, y)$ of said first reference plane and a horizontal displacement $x_o$ of said axis of rotation of said slit light relative to an orgin of said reference plane in accordance with the equation:

$$f(x, y) = \{\tan \theta_o(x, y) - \tan \theta(x, y)\}(x_o - x)$$

16. A measuring apparatus according to claim 12, wherein said image processing means determines a three-dimensional shape f(x, y) of said object according to two-dimensional coordinates x and y on the basis of a composite image $\theta(x, y)$ of said object, a composite image $\theta_o(x, y)$ of said first reference plane and a vertical displacement $z_o$ of said axis of rotation of said slit light relative to an origin of said reference plane in accordance with the equation:

$$f(x, y) = \left( 1 - \frac{\tan \theta(x, y)}{\tan \theta_o(x, y)} \right) z_o$$

17. A measuring apparatus according to claim 12, wherein said image processing means determines a three-dimensional shape f(x, y) of said object according to two-dimensional coordinates x and y a composite image $\theta_0(x, y)$ of said first reference plane and a composite image $\theta_1(x, y)$ of a second reference plane which is parallel to and separated by a distane d from said first reference plane in accordance with the equation:

$$f(x, y) = \frac{\tan \theta_o(x, y) - \tan \theta(x, y)}{\tan \theta_o(x, y) - \tan \theta_1(x, y)} d$$

18. An apparatus for measuring a three-dimensional curved surface shape comprising:

slit light projecting means for projecting a linear slit light onto a surface of an object to be measured on a first reference plane from a direction forming and angle $\theta$ with said first reference plane which is not equal to 90°;

slit light scanning means for causing said linear slit light to scan the surface of said object on said first reference plane;

a television camera for picking up the surface of said object from a direction different from the direction of projection of said slit light projecting means;

image composing means for composing a composite image of the surface of said object by composing an image in which video signals of the same picture element are successively applied from said television camera and successively compared in magnitude so as to renew said same picture element in a memory means by using a value thereof information relating to scanning of said slit light at a time of application of the greater one of said compared video signals, whereby a value of each of said picture elements in said memory means is represented by said respective information relating to scanning of said slit light at an instant when said slit light passes through a measuring point corresponding to said respective picture element;

image processing means for measuring a three-dimensional curved surface shape in accordance with said composite image of said object;

said slit light scanning means linearly scanning said slit light all over the surface of said object and said image processing means measures a three-dimensional curved surface shape of said object in accordance with the difference between the values of the picture elements of said composite image of said object and the values of the picture elements of a preliminarily determined composite image of said first reference plane;

and said image processing means determines a three-dimensional shape f(x, y) of said object on the basis of a composite image u(x, y) of said object, a composite image $u_o(x, y)$ of said first reference plane and said slit light projection angle $\theta$ with respect to said first reference plane in accordance with the equation:

$$f(x, y) = (u_o(x, y) - u(x, y)) \tan \theta$$

where x and y are the positional coordinates of the picture elements.

* * * * *

UNITED STATES PATENT AND TRADEMARK OFFICE
CERTIFICATE OF CORRECTION

PATENT NO. : 5,102,223
DATED : April 7, 1992
INVENTOR(S) : UESUGI et al

It is certified that error appears in the above-indentified patent and that said Letters Patent is hereby corrected as shown below:

Title page, left column, item[22],
amend to read: Filed: February 7, 1991

Signed and Sealed this

Twelfth Day of July, 1994

Attest:

BRUCE LEHMAN

Attesting Officer    Commissioner of Patents and Trademarks